United States Patent
Oscherov et al.

(10) Patent No.: US 8,655,857 B1
(45) Date of Patent: Feb. 18, 2014

(54) DYNAMIC CONSTRUCTION OF JAVA CLASS HIERARCHY BASED ON METADATA

(75) Inventors: Alex Oscherov, Danville, CA (US); Meir Amiel, Pleasanton, CA (US); Victor Spivak, San Mateo, CA (US); David Buccola, Pleasanton, CA (US)

(73) Assignee: EMC Corporation, Hopkinton, MA (US)

( * ) Notice: Subject to any disclaimer, the term of this patent is extended or adjusted under 35 U.S.C. 154(b) by 1592 days.

(21) Appl. No.: 11/430,428

(22) Filed: May 8, 2006

Related U.S. Application Data (60) Provisional application No. 60/787,241, filed on Mar. 30, 2006.

(51) Int. Cl.
*G06F 7/02* (2006.01)
*G06F 17/30* (2006.01)

(52) U.S. Cl.
USPC ............ 707/695; 707/802; 717/165; 717/166

(58) Field of Classification Search
USPC .......... 707/101–103; 717/100, 116, 165–166; 719/328, 331–332
See application file for complete search history.

(56) References Cited

U.S. PATENT DOCUMENTS

| | | | |
|---|---|---|---|
| 6,826,750 B1 * | 11/2004 | Curtis et al. | 717/170 |
| 2003/0233374 A1 * | 12/2003 | Spinola et al. | 707/104.1 |
| 2008/0163160 A1 * | 7/2008 | Bloesch et al. | 717/104 |

* cited by examiner

*Primary Examiner* — Bruce Moser
(74) *Attorney, Agent, or Firm* — Van Pelt, Yi & James LLP (57) ABSTRACT

Integrating a new class into a class hierarchy is disclosed. A new class having a place in a class hierarchy is received. Metadata, associated with the new class, that includes the new class's place in the class hierarchy is also received. Hierarchy data associated with a previously compiled class is dynamically modified to reflect the place of the new class in the class hierarchy.

22 Claims, 5 Drawing Sheets

FIG. 4

DYNAMIC CONSTRUCTION OF JAVA CLASS HIERARCHY BASED ON METADATA

CROSS REFERENCE TO OTHER APPLICATIONS

This application claims priority to U.S. Provisional Patent Application No. 60/787,241 entitled DYNAMIC CONSTRUCTION OF JAVA CLASS HIERARCHY BASED ON METADATA filed Mar. 30, 2006 which is incorporated herein by reference for all purposes.

BACKGROUND OF THE INVENTION

Content management systems are used to organize, manipulate, and archive collections of content for organizations. In some cases, a content management system is developed in part by a customer. A content management system vendor provides general or underlying platforms, services, and/or objects referred to as a base product. The customer, or a developer hired by the customer, defines and develop products (e.g., custom applications) that run on or otherwise interact with the base product provided by a content management system vendor. The product(s) developed by a customer and the base product collectively form a content management system.

The portion of the content management system developed by a content management system vendor may affect the portion developed by a customer and vice versa. In some content management systems, a content item is represented within a body of managed content by one or more persistent software objects, sometimes referred to herein as "implementation objects". The objects include metadata about and/or other attribute data associated with the content item, and in some cases its relationship to other content, and/or methods available to be performed with respect to the content item, such as check-in, check-out, save, versioning, etc.

In some systems, the vendor-supplied content management system includes a set of foundation classes for managing content. The foundation classes include classes for managing commonly encountered content items, such as documents, database files/tables, etc. However, a customer may desire to define one or more custom classes to manage specific content with specific content management requirements. In one example, the customer is a hospital that wants to store patient medical records, including by defining a record as a virtual or complex object to which other content items are related, e.g., lab results, health history, physician/nursing staff notes, etc. Such a customer may develop one or more custom classes of objects to represent patient medical records and related content. The custom class in some cases may be built based on a basic document or basic "record" class provided by the content management system vendor and/or defined previously as a custom class. Such a class typically is related to the base (parent) class in a hierarchy of classes on the content management system. In such a system, changes by the content management system vendor or another third party to one or more non-custom classes, such as a parent class of a custom class developed by a customer, and/or insertion of one or more new classes in the class hierarchy in a typical system would result in a need to recompile classes that depend directly or indirectly from the modified or new class(es). This may be inconvenient or annoying to a customer, potentially resulting in lost data, system downtime, etc., and in any event would require that there be a mechanism to inform the customer of the need to recompile custom classes. It would be useful to have a content management system in which changes affecting implementation class hierarchy would not require that affected classes be recompiled.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamically modifying hierarchy data is disclosed. A new class having a place in a class hierarchy is received. In some embodiments, the new class is defined by a development entity such as a content management system vendor. Metadata that includes the new class's place in the hierarchy is received. Hierarchy data associated with a previously compiled class is dynamically modified to reflect the new class's place in hierarchy. Dynamically modifying in some embodiments avoids recompiling. In some embodiments, the hierarchy data modified is associated with a Java class hierarchy. In some embodiments, byte manipulation is performed on one or more affected classes to modify the class's hierarchy data in place, obviating the need to recompile the affected class(es).

Figure 1:
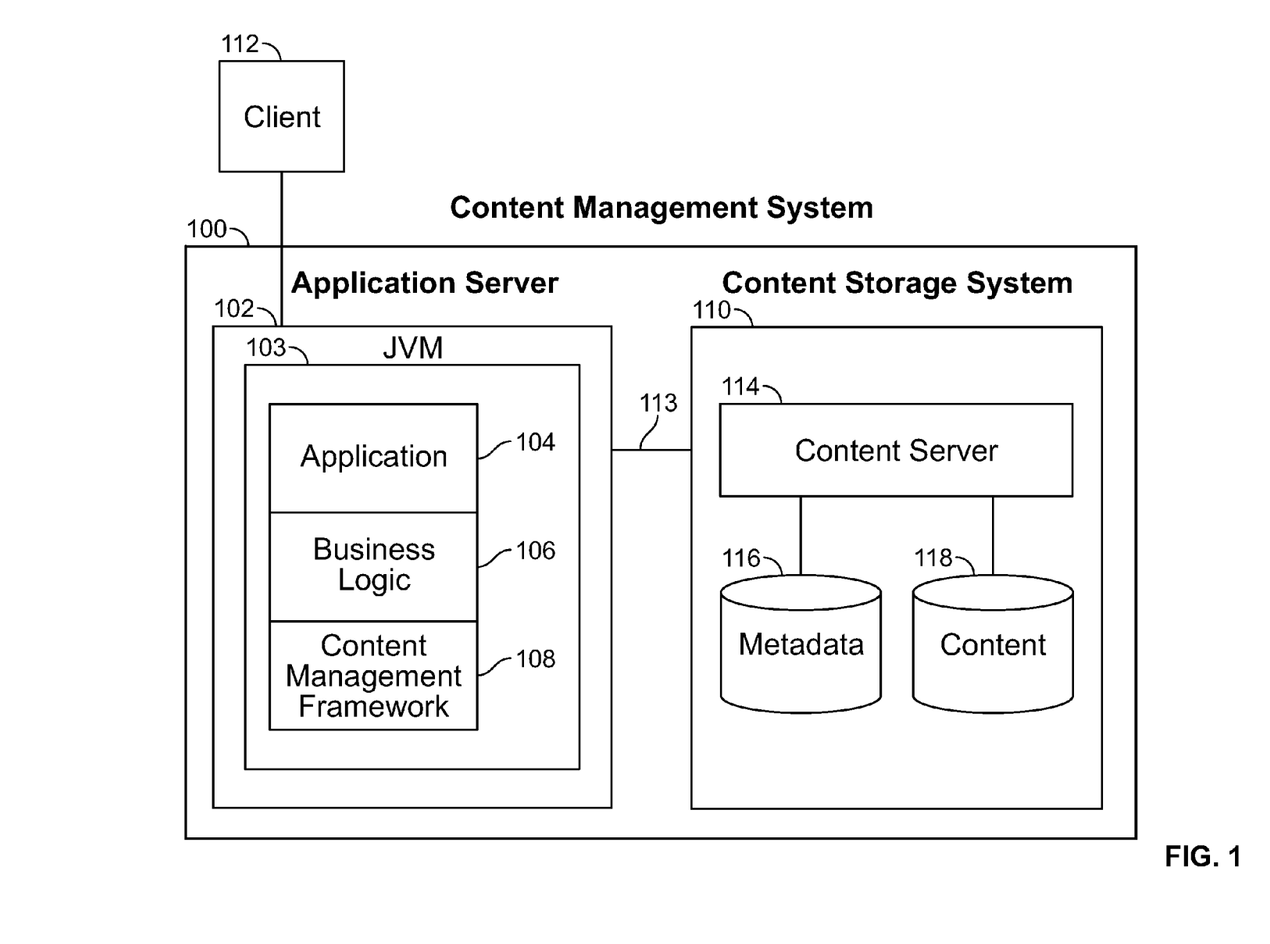
FIG. 1 is a block diagram illustrating an embodiment of a content management system.

FIG. 1 is a block diagram illustrating an embodiment of a content management system. In the example shown, content management system 100 includes application server 102 and content storage system 110. Content storage system 110 stores items of content. Access to and manipulation of content stored on content storage system 110 is provided through application server 102. In some embodiments, application server 102 and content storage system 110 comprise a single physical system. In some embodiments, application server 102, content storage system 110, or both is/are implemented using two or more physical systems.

Application server 102 includes Java Virtual Machine (JVM) 103. In some embodiments, application 104, business logic 106, and/or content management framework 108 are implemented in Java and run on JVM 103. In some embodiments, other technologies besides Java are used to implement some or all components of application server 102. Examples of such other technologies include other object oriented languages such as C++.

Application 104 is configured to interact with and use business logic 106 running on a content management framework 108 to manage one or more items of content stored on content storage system 110. In some embodiments, content management framework 108 includes a set of foundation classes of objects used to represent and provide content management services with respect to items of content stored on content storage system 110. Business logic 106 in some embodiments is implemented at least in part as a business object framework, including logic and/or methods that instantiate, populate, and otherwise use objects associated with the content management framework. In some embodiments, application 104 interacts with business logic 106 via a published or other API to ingest and store items of content in content storage system 110 and to provide managed access to and control over items of content stored in content storage system 110.

In the example shown, client 112 is configured to access application server 102 (e.g., via a network) to create and/or otherwise provide new content; search for, retrieve, or otherwise access content managed by and/or otherwise associated with application server 102; and/or obtain other content management related services with respect to content managed by application server 102.

Content storage system 110 includes content server 114 configured to send/receive content via communication interface 113. In some embodiments, application server 102 and content storage system 110 are implemented as two or more physical systems and communication interface 113 comprises a network connection. Content server 114 provides access to content associated with and/or stores new content in content storage 118. In some embodiments, content storage 118 includes content addressed storage and/or other external content storage system, such as an EMC Centera™ system available commercially from EMC Corporation. The content server 114 stores in and/or accesses from metadata storage 116 metadata derived from and/or otherwise associated with items of content stored in content storage 118. In some embodiments, metadata storage 116 includes one or more database applications and/or systems, such as an Oracle™ database. In various embodiments, the metadata stored in metadata storage 116 includes one or more document and/or content objects representing and/or otherwise associated with items of managed content stored in content storage 118, and/or or one or more full text indexes and/or associated entries associated with content stored in content storage 118. In various embodiments, metadata stored in metadata storage 116 is used to track and/or provide access to successive versions of an item of content, such as a file or other item of content and/or to provide other content management functionality.

In some embodiments, implementation classes are deployed in the repository (e.g., content storage system 110) and downloaded to content management framework 108. Upon initial configuration and startup of application server 102, one or more class loaders are instantiated and used to downloaded foundation implementation classes from the repository. Custom classes defined and/or modified by a customer or other party, and added and/or changed base product classes provided as updates by a vendor of the content management system, are registered with the repository. The registration process in some embodiments includes providing metadata about the class and its relationship to other classes comprising the content management system, e.g., hierarchy data indicating the class's place in a hierarchy of implementation object classes. On download of a new or modified class, as described more fully below, the metadata is used to dynamically modify class hierarchy data in one or more classes having hierarchy relationships affected by the new or modified class to reflect the new hierarchy. In some embodiments, one or more special class loaders configured to perform byte manipulations to make such changes in class hierarchy data, in place and without requiring that the affected class be recompiled, also are stored in the repository and/or otherwise provided and/or identified as part of the class registration process.

In one example, content management system 100 is used to store and manage content associated with a car catalog. A customer or third party developer developed a custom implementation class for managing car catalog content. The custom class includes attributes and methods associated with car catalogs, either inherited from a parent class, such as a base "document" implementation class provided by a vendor of content management system 110, or particular to the car catalog class. In some embodiments, the "car catalog" class is registered with the repository and stored originally, with associated metadata, in content storage system 110. Once downloaded to content management framework 108, in various embodiments application code comprising application 104, logic (e.g., services) comprising business logic 106, or both are used as required, e.g., to store a new (or new version of a) car catalog, to instantiate an object of the car catalog class, populate object attributes, and associate the object with the content it represents. Once instantiated, populated, and associated with content, the implementation object is stored persistently in the repository and available to be accessed and used at runtime as a runtime instance on application server 102, e.g., to allow application code and/or business logic to invoke methods of the implementation object as required to access, use, store, and otherwise manage the associated content.

Figure 2A:
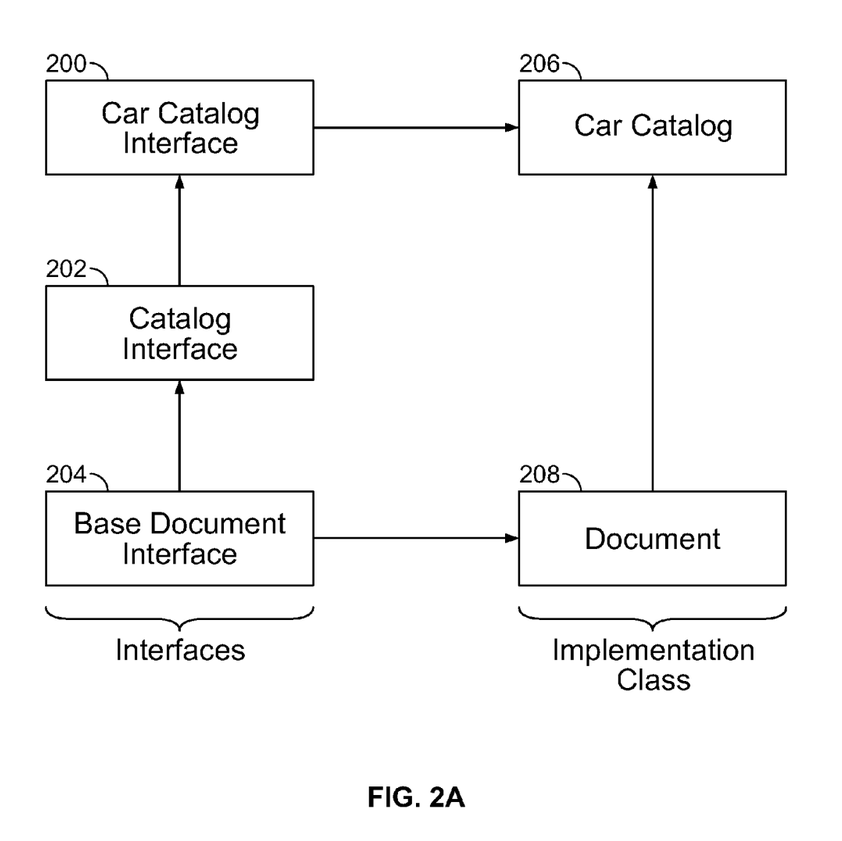
FIG. 2A is a diagram illustrating an embodiment of implementation classes and interfaces in a hierarchical relationship.

FIG. 2A is a diagram illustrating an embodiment of implementation classes and interfaces in a hierarchical relationship. In the example shown, the implementation classes and interfaces are associated with a car catalog. In the process of generating a car catalog, objects are instantiated using the implementation classes and interfaces, populated with data and associated with content, and the object and associated content stored. The implementation object is then available to manage, access, and/or use the associated content.

The right hand column shows implementation classes and their place within a hierarchy of implementation classes. Properties of a parent implementation class are inherited by a child implementation class based on the hierarchy. In this example, car catalog class 206 inherits properties of document class 208. Document class 208 in this example is associated with documents in general and is the parent class of one or more child implementation classes, each associated with a specific type of document. For example, document class 208 may be used by a publishing company, a law firm, or a hospital to represent general content, but any one or more of the same entities may define and use a custom implementation class that is a child of document class 208 to represent content having particular characteristics and/or content management or other requirements. In the example shown, car catalog class 206 is associated with objects that address the particular needs of a car catalog producer. Car catalog class 206 includes, e.g., one or more attributes and/or one or more methods particular to car catalogs.

Interfaces associated with the implementation classes are illustrated in the left hand column. In this example, each interface is associated with a particular implementation class. In some embodiments, an association between interface(s) and implementation class(es) varies from that shown. Car catalog interface 200 and catalog interface 202 are associated with car catalog class 206; base document interface 204 is associated with document class 208. Interfaces 200-204 expose methods of the underlying implementation classes and are used by application code and/or business logic to invoke such methods.

In this example, a car catalog producer (or a developer on behalf of the car catalog producer) has defined and developed car catalog interface 200, catalog interface 202, and car catalog class 206. The car catalog producer is a customer of a content management system vendor. Base document interface 204 and document class 208 in this example have been developed and provided by a content management system vendor as part of a base product and the customer has developed (or has had another develop) custom interfaces 200 and 202 and custom implementation class 206.

In some embodiments, the implementation classes, interfaces, and hierarchy shown are associated with a Java class hierarchy. Alternatively, they may be associated with a different type of technology besides Java.

Figure 2B:
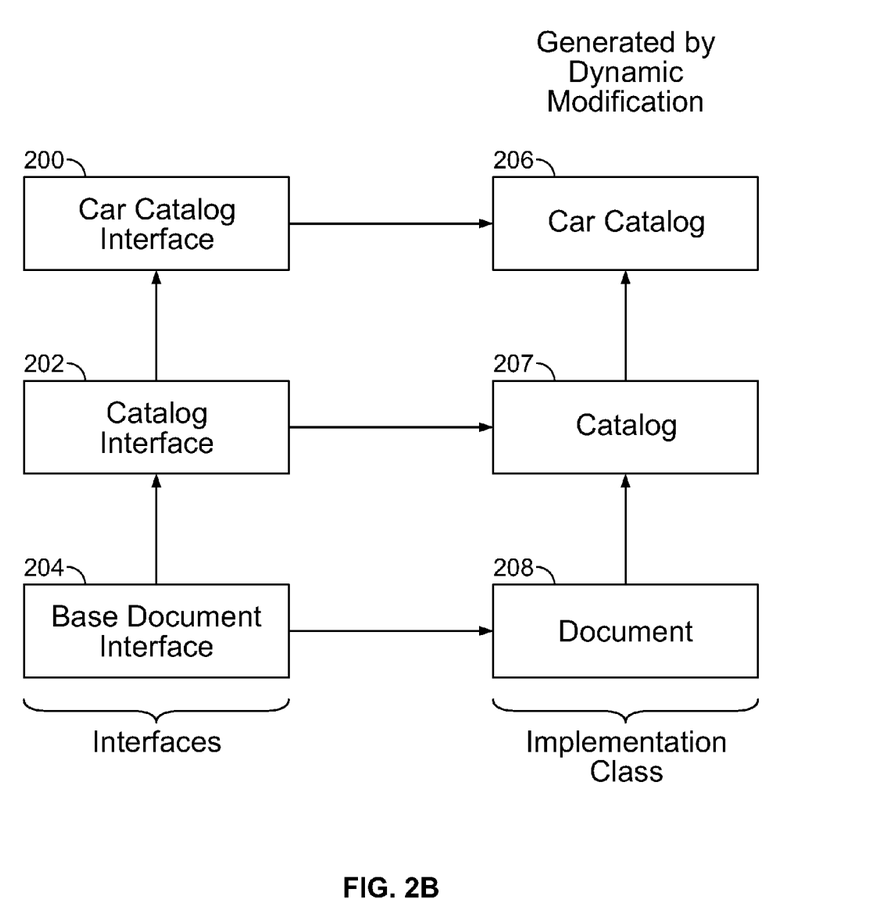
FIG. 2B is a diagram illustrating an embodiment of a new hierarchy generated using dynamic modification.

FIG. 2B is a diagram illustrating an embodiment of a new hierarchy generated using dynamic modification. In the example shown, a new class, catalog class 207, has been added to the hierarchy of FIG. 2A. In the new hierarchy, document class 208 is the parent of catalog class 207 which in turn is the parent of car catalog class 206. In addition, catalog class 207 is now associated with catalog interface 202. An example of a situation in which a new implementation class would be defined and inserted in a class hierarchy, as in the example shown in FIG. 2B, include where a customer or other user wishes to use some elements of an implementation class and/or its interfaces that are common to other, similar content, e.g., in this case page layouts, methods, etc. that were developed initially for a car catalog but are equally applicable to and useful with respect to catalogs for items other than cars.

Dynamic, in-place modification of class hierarchy data, e.g., to implement a change in class hierarchy such the change illustrated by FIGS. 2A and 2B, is disclosed. Dynamic modification in some embodiments avoids recompiling. Traditionally, introduction of a new class within a class hierarchy, such as catalog class 207 in FIG. 2B, would require that classes that depend from the inserted class, e.g., child classes of that class such as car catalog class 206 in the example shown, be recompiled to reflect the new/changed class hierarchy. In some embodiments, dynamic modification includes altering hierarchy data of one or more classes, e.g., through byte manipulation, to reflect a change in hierarchy without requiring recompilation.

Byte manipulation can be performed using a variety of mechanisms and/or tools. In one example, a class loader is used that before instantiation of the class from the repository analyses a hierarchy of interfaces and implementation classes, loads implementation class(es) as a byte array, finds bytes that point to the parent class and changes these bytes so that they point to a different base class. The location and/or structure of the bytes are known a priori and can thus be located and properly manipulated. The bytes that point to a parent class are described, for example, in Java documentation or other appropriate documentation regarding the technology used. The new byte-manipulated class is then instantiated.

In some embodiments, two or more new classes are added to a class hierarchy. For example, at a first point in time a first new class is added to an existing hierarchy associated with compiled data. When an object is instantiated after the first point in time, byte manipulation is performed on a prior hierarchy to include the first new class in its appropriate place in the class hierarchy. Some time after the first point in time, a second class is added to the hierarchy at a second point in time. Byte manipulation performed after the second point in time inserts the first and second new classes in the hierarchy. In some embodiments, a new class may be associated with a new interface rather than an existing interface.

Figure 3:
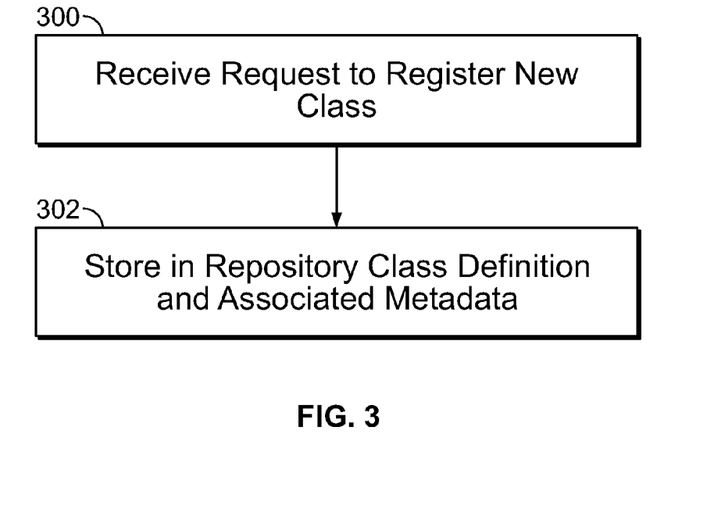
FIG. 3 is a flowchart illustrating an embodiment of storing information associated with a new class.

FIG. 3 is a flowchart illustrating an embodiment of storing information associated with a new class. In some embodiments, the process is performed by a content storage system, such as system 110 of FIG. 1. In the example shown, a request to register a new class is received at 300. The new class may have a place within an existing hierarchy associated with compiled data. At 302, class definition and associated metadata are stored in a repository. The stored class definition and associated metadata are associated with the new class. The associated metadata includes data indicating a place of the new class within in a hierarchy of classes. The place within the hierarchy of classes may be described in any suitable way. For example, in some embodiments metadata stored at 302 includes existing classes that are referenced by a new class and existing classes that reference the new class.

Figure 4:
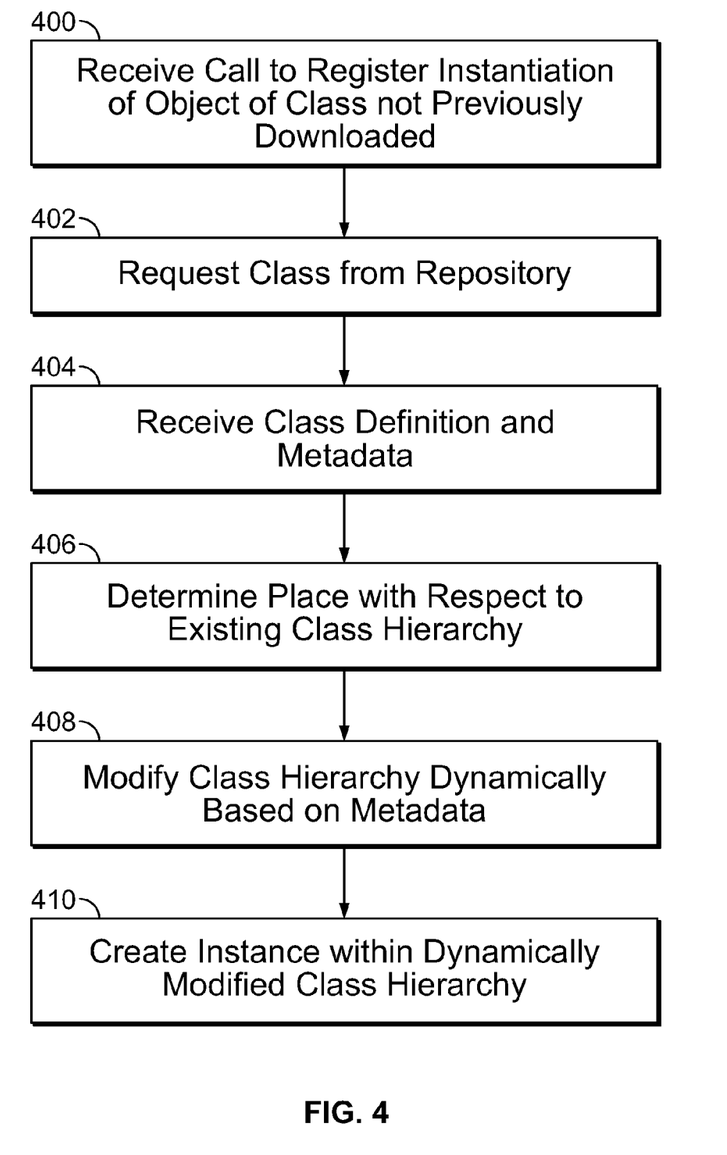
FIG. 4 is a flowchart illustrating an embodiment of dynamically modifying an existing hierarchy to include a new class.

FIG. 4 is a flowchart illustrating an embodiment of dynamically modifying an existing hierarchy to include a new class. In some embodiments, the process is performed by an application server, such as application server 102. In the example shown, at 400 a call to instantiate an object of a class not previously downloaded is received. At 402, the class is requested from a repository. A class definition and metadata are received at 404. A place with respect to an existing class hierarchy is determined at 406. The existing class hierarchy may be associated with compiled data and may not necessarily include the new class. The metadata received at 404 in some embodiments includes hierarchy information for the new class. At 408, class hierarchy is modified dynamically based at least in part on the metadata received at 404. In some embodiments, dynamically modifying a hierarchy is performed by byte manipulation. An instance of the object requested at 400 is created within a dynamically modified class hierarchy at 410.

In some embodiments, a class loader is downloaded from a repository, e.g., at 404 of FIG. 4. The class loader may be a utility object/class, script, or other executable that performs dynamic modification on an existing hierarchy. In one example, a custom class loader performs steps 406 and 408. In some embodiments, the custom class loader is obtained from a repository, e.g., at 404 and/or by operation and/or in response to logic at the application server invoked, e.g., by and/or in response to a non-custom class loader, such as a JVM class loader, in response to a user "hook" or other indication provided to the non-custom class loader that a custom class loader should be downloaded and/or used. A repository may have obtained the custom class loader from the development entity that provided the class definition and associated metadata for the new class, e.g., in connection with registering the new class. In some embodiments, the custom class loader includes a different set of functions than that described herein.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of integrating a new class into a class hierarchy, comprising:
    receiving a new class having an insertion point within a class hierarchy, wherein the insertion point is associated with a parent class and a child class between which the new class is to be inserted in the class hierarchy;
    receiving metadata, associated with the new class, that includes the insertion point of the new class in the class hierarchy; and
    using a processor to insert the new class into the class hierarchy at the insertion point without recompiling the child class, including by:
        loading hierarchy data, which is associated with a previously compiled class and which does not include the new class in the class hierarchy, as an array;
        locating a portion of the loaded array that is associated with identifying the parent class as the parent of the child class; and
        generating modified hierarchy data that integrates the new class into the class hierarchy at the insertion point, including by modifying the located portion of the loaded array such that the new class is identified as the parent of the child class and the parent class is no longer identified as the parent of the child class.

2. A method as recited in claim 1, wherein the class hierarchy comprises a Java class hierarchy.

3. A method as recited in claim 1, wherein the new class comprises an implementation class configured to provide a content management functionality.

4. A method as recited in claim 1 further including instantiating an object associated with the new class.

5. A method as recited in claim 1 further including obtaining a class loader configured to dynamically modify the hierarchy data associated with the previously compiled class.

6. A method as recited in claim 1, wherein the new class is associated with a first development entity and the previously compiled class is associated with at least a second development entity.

7. A method as recited in claim 1, wherein receiving metadata includes obtaining metadata from a repository.

8. A method as recited in claim 1, wherein the new class is associated with a previously compiled interface.

9. A method as recited in claim 1, wherein a property of the parent class inherited by the new class includes a process associated with managing content.

10. A method as recited in claim 1 further comprising:
    after the new class is inserted into the class hierarchy at the insertion point, receiving a second new class having a second insertion point within the class hierarchy, wherein the second insertion point is associated with a second parent class and a second child class between which the second new class is to be inserted in the class hierarchy; and
    using the processor to insert the second new class into the class hierarchy at the second insertion point without recompiling the second child class, including by:
        loading the hierarchy data as an array for a second time;
        locating a first portion, of the array loaded for the second time, that is associated with identifying the parent class as the parent of the child class;
        locating a second portion, of the array loaded for the second time, that is associated with identifying the second parent class as the parent of the second child class; and
        generating second modified hierarchy data that integrates the new class and the second new class into the class hierarchy at the insertion point and the second insertion point, respectively, including by:
            modifying the first located portion, of the array loaded for the second time, such that the new class is identified as the parent of the child class and the parent class is no longer identified as the parent of the child class; and
            modifying the second located portion, of the array loaded for the second time, such that the second new class is identified as the parent of the second child class and the second parent class is no longer identified as the parent of the second child class.

11. A system for integrating a new class into a class hierarchy, comprising:
    an interface configured to:
        receive a new class having an insertion point within a class hierarchy, wherein the insertion point is associated with a parent class and a child class between which the new class is to be inserted in the class hierarchy; and
        receive metadata, associated with the new class, that includes the insertion point of the new class in the class hierarchy; and
    a processor configured to insert the new class into the class hierarchy at the insertion point without recompiling the child class, including by:
        loading hierarchy data, which is associated with a previously compiled class and which does not include the new class in the class hierarchy, as an array;
        locating a portion of the loaded array that is associated with identifying the parent class as the parent of the child class; and
        generating modified hierarchy data that integrates the new class into the class hierarchy at the insertion point, including by modifying the located portion of the loaded array such that the new class is identified as the parent of the child class and the parent class is no longer identified as the parent of the child class.

12. A system as recited in claim 11, wherein the class hierarchy comprises a Java class hierarchy.

13. A system as recited in claim 11, wherein the new class comprises an implementation class configured to provide a content management functionality.

14. A system as recited in claim 11, wherein the new class is associated with a first development entity and the previously compiled class is associated with at least a second development entity.

15. A system as recited in claim 11, wherein a property of the parent class inherited by the new class includes a process associated with managing content.

16. A system as recited in claim 11, wherein:
the interface is further configured to: after the new class is inserted into the class hierarchy at the insertion point, receive a second new class having a second insertion point within the class hierarchy, wherein the second insertion point is associated with a second parent class and a second child class between which the second new class is to be inserted in the class hierarchy; and
the processor is further configured to insert the second new class into the class hierarchy at the second insertion point without recompiling the second child class, including by:
loading the hierarchy data as an array for a second time;
locating a first portion, of the array loaded for the second time, that is associated with identifying the parent class as the parent of the child class;
locating a second portion, of the array loaded for the second time, that is associated with identifying the second parent class as the parent of the second child class; and
generating second modified hierarchy data that integrates the new class and the second new class into the class hierarchy at the insertion point and the second insertion point, respectively, including by:
modifying the first located portion, of the array loaded for the second time, such that the new class is identified as the parent of the child class and the parent class is no longer identified as the parent of the child class; and
modifying the second located portion, of the array loaded for the second time, such that the second new class is identified as the parent of the second child class and the second parent class is no longer identified as the parent of the second child class.

17. A computer program product for integrating a new class into a class hierarchy, the computer program product being embodied in a non-transitory computer readable storage medium and comprising computer instructions for:
receiving a new class having an insertion point within a class hierarchy, wherein the insertion point is associated with a parent class and a child class between which the new class is to be inserted in the class hierarchy;
receiving metadata, associated with the new class, that includes the insertion point of the new class in the class hierarchy; and
inserting the new class into the class hierarchy at the insertion point without recompiling the child class, including by:
loading hierarchy data, which is associated with a previously compiled class and which does not include the new class in the class hierarchy, as an array;
generating modified hierarchy data that integrates the new class into the class hierarchy at the insertion point, including by modifying the located portion of the loaded array such that the new class is identified as the parent of the child class and the parent class is no longer identified as the parent of the child class.

18. A computer program product as recited in claim 17, wherein the class hierarchy comprises a Java class hierarchy.

19. A computer program product as recited in claim 17, wherein the new class comprises an implementation class configured to provide a content management functionality.

20. A computer program product as recited in claim 17, wherein the new class is associated with a first development entity and the previously compiled class is associated with at least a second development entity.

21. A computer program product as recited in claim 17, wherein a property of the parent class inherited by the new class includes a process associated with managing content.

22. A computer program product as recited in claim 17 further comprising computer instructions for:
after the new class is inserted into the class hierarchy at the insertion point, receiving a second new class having a second insertion point within the class hierarchy, wherein the second insertion point is associated with a second parent class and a second child class between which the second new class is to be inserted in the class hierarchy; and
inserting the second new class into the class hierarchy at the second insertion point without recompiling the second child class, including by:
loading the hierarchy data as an array for a second time;
locating a first portion, of the array loaded for the second time, that is associated with identifying the parent class as the parent of the child class;
locating a second portion, of the array loaded for the second time, that is associated with identifying the second parent class as the parent of the second child class; and
generating second modified hierarchy data that integrates the new class and the second new class into the class hierarchy at the insertion point and the second insertion point, respectively, including by:
modifying the first located portion, of the array loaded for the second time, such that the new class is identified as the parent of the child class and the parent class is no longer identified as the parent of the child class; and
modifying the second located portion, of the array loaded for the second time, such that the second new class is identified as the parent of the second child class and the second parent class is no longer identified as the parent of the second child class.

* * * * *